Patented May 29, 1945

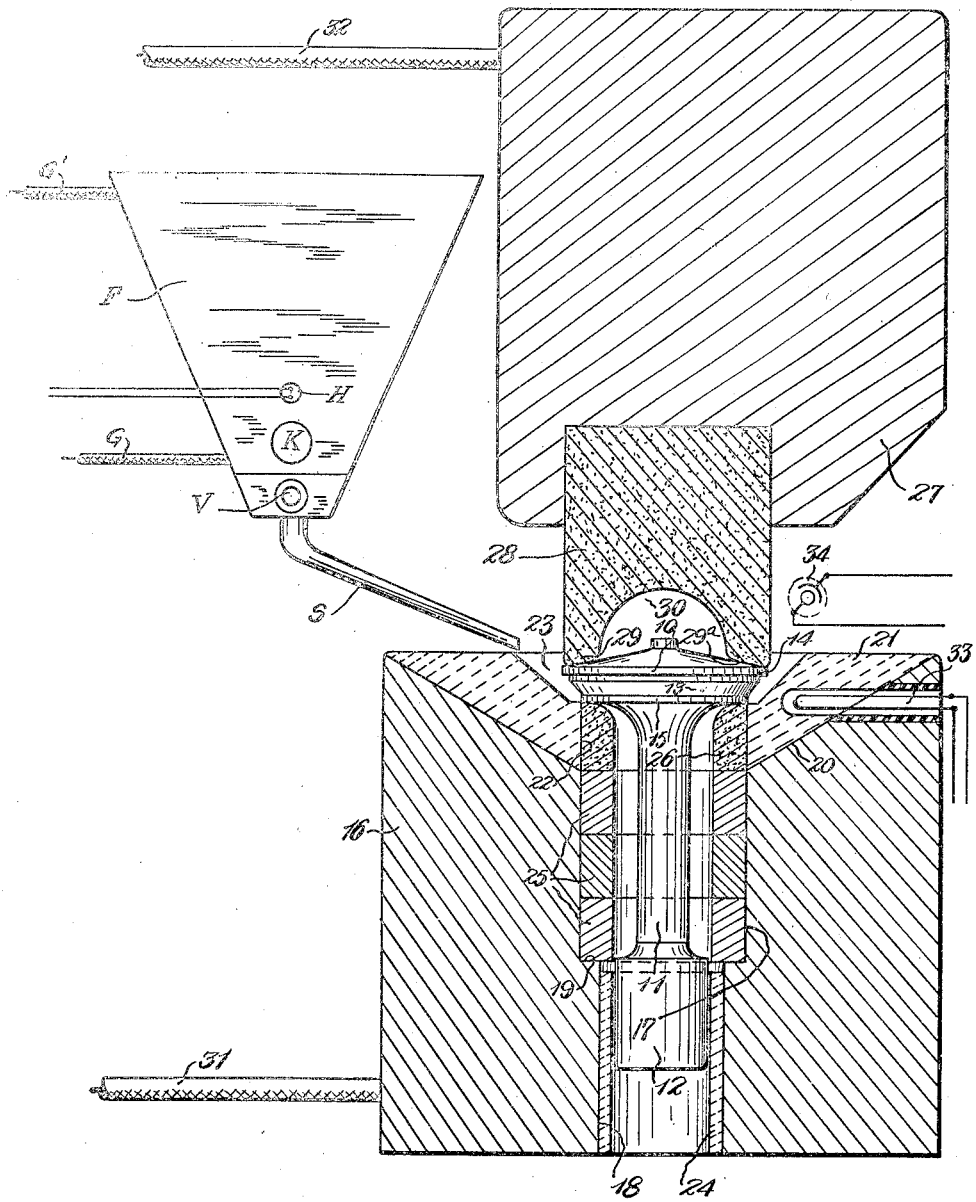

2,377,163

UNITED STATES PATENT OFFICE 2,377,163

PROCESS OF AND APPARATUS FOR BONDING METALS

Antonio Longoria, South Euclid, Ohio, assignor of one-half to Unit Rays, Inc., Cleveland, Ohio, a corporation of Ohio Application February 4, 1942, Serial No. 429,556

11 Claims. (Cl. 22—116)

This invention relates to a process of and apparatus for the bonding of metals, and more particularly to a process of and apparatus for bonding metals having different melting points. The particular embodiment of my invention which is shown and described in detail herein is particularly useful for the bonding of stellite facings to the tapered or frusto-conical peripheral portions of valves such as are used with airplane motors. However, as will be evident to those skilled in the art, my invention is capable of other uses than that specifically referred to above; and I do not intend, by the disclosure of a particular use, to preclude myself from the right to such other uses.

As is well known to those acquainted with the construction of valves of the type with which airplane engines are equipped, the heads of these valves are made of an alloy steel, and the frusto conical peripheral seating portions of these valves are provided each with a facing of stellite, the same consisting usually of an alloy of cobalt, chromium and tungsten, this alloy possessing the properties of being "hot hard" and of resistance to shock as by impact as well as resistance to oxidation by the lead content of the high octane fuels employed in said engines. The only method which has been in commercial use for bonding stellite to the seating portions of the valves has been that accomplished by means of acetylene welding torches. The practice of this method, however, requires great care and skill; is trying upon the eyes of the operators; and is time-consuming, requiring some fifteen minutes for each operation. Furthermore, unless unusual care is taken, an undesirable proportion of the metal of the valve will migrate into the stellite—producing a condition therein which is detrimental to enabling it to perform its intended function as a valve facing.

The general objects of my invention are not only to effect a great saving in time in bonding metals having different melting points and more particularly in the bonding of stellite to the tapered seating portions of valve bodies, but also to accomplish this result without any material intermingling of valve metal with the stellite.

I accomplish the foregoing objects of my invention by means of the methods set forth hereinafter and accomplished by the apparatus shown more or less schematically in the drawing appended hereto, wherein the figure represents one form of apparatus capable of realizing my invention, the said figure showing a vertical sectional view through the means for supporting and heating the valve and for forming a ring about the seating portion thereof, the valve being shown in elevation, and wherein an electrical furnace with means for controlling the temperature thereof, and the means for automatically cutting off the supply of current to the peripheral portion of the valve, are shown schematically.

Describing by reference characters the parts shown in the drawing, 10 denotes generally the head of a valve, such as is employed with the engines of airplanes, and 11 the stem thereof, the said stem having an enlarged cylindrical lower end 12 and being also provided with a tapered or frusto conical seating portion 13, shoulders 14 and 15 being shown as provided respectively above and below the said seating portion. It will be understood that the drawing does not show the valve in the final machined condition which it will assume before it may be assembled into an engine. The surplus metal appearing thereon in various places facilitates the application of the stellite facing thereto and the machining of said facing, as well as subsequent processing steps.

16 denotes a block of material possessing high electrical conductivity and incidentally high heat conductivity. The material which I prefer to use is copper, because it possesses high electrical conductivity. As will be noted, this block is of large cross-sectional area, whereby it is capable of carrying a heavy or high current without becoming unduly heated thereby; it is shown as provided with an upper cylindrical bore section 17 and a lower cylindrical bore section 18 constituting an extension of the upper section but being of less diameter than the same, there being an annular shoulder 19 interposed between the said bore sections.

The upper surface of the block 16 is formed into an inverted frusto conical seat 20, extending outwardly from the upper end of the bore section 17. This seat supports a mold 21 of refractory material which will not carburize the metal therewithin and which will not short-circuit the current. In practice, I have found lava rock suitable for making molds possessing the requisite qualities of being practically electrically non-conductive and of being incapable of carburizing molten metal in contact therewith. The mold is shown as provided with a bore 22 constituting an extension of the bore section 17. This bore 22 extends preferably upwardly as far as the bottom of the lower shoulder 15 of the valve head, the said bore being preferably of the same diameter as that of the shoulder. An annular mold cavity 23 is provided between the upper surface of the mold and the peripheral tapered portion of the valve head. The mold is shown as extending above the upper shoulder 14 of the valve body, for purposes to be described hereinafter. The mold 21 is interchangeable with others having inner walls differing therefrom and from one another in contour, in order to provide mold cavities 23 of suitable shape and extent to accommodate variations in the shapes or forms of the portions of the valve bodies with which they may respectively cooperate.

24 denotes a bushing of refractory material fitted within the lower bore section 18 and serving as a means for centering the lower end 12 of the valve stem and electrically insulating the latter from the block 16.

The shoulder 19 is shown as supporting a plurality of rings 25 of carbon possessing relatively high electrical resistivity and low heat conductivity, the said rings engaging the surrounding wall of the bore section 17. These rings extend upwardly as far as the bottom of the mold 21.

26 denotes an electrode in the form of a ring of carbon of high heat resistivity and somewhat lower specific electrical resistivity than the rings 25. The carbon which I prefer to use for this purpose is graphite. It will be noted that the ring 26 fits within the bore 22 of the mold and that its upper end is beveled outwardly from the interior thereof, whereby only a limited annular contact area is provided between the top of the ring and the lower shouldered portion 15 of the valve head, adjacent to the bottom of the surface of the tapered portion 13 of the valve head. Due to this beveling of the graphite ring, its electrical resistance is greatly increased where it contacts with the valve head.

27 denotes an upper block, preferably of copper, having a large diameter whereby it is capable of carrying a heavy electrical current without being unduly heated thereby.

28 denotes an electrode which is mounted within a cavity provided therefor in the lower end of the block 27, the said electrode also being preferably of graphite, for purposes explained in connection with the electrode ring 26, and having its lower end formed into an external ring 29 surrounding a central cavity 30, said ring having a downwardly and outwardly beveled surface 29ᵃ which is adapted to engage the upper external portion of the valve head above the shoulder 14 and above the upper end of the surface of the tapered seating portion 13. The effect of beveling the lower end of the ring 29 is the same as that accomplished by beveling the upper end of the ring 26.

The electrodes 26 and 28 and the rings 25 are removable for purposes of renewal, reshaping and substitution.

The apparatus shown and thus far described was designed with special reference to solving the problems arising from bonding to the surface of a metal body having a relatively high melting or fusing point, a metal having a lower fusing or melting point, including the problem of preventing the detrimental intermingling of the two metals. As is known to those skilled in the art, the alloy from which the heads of the valves referred to herein are made has a melting point of approximately 2700° F. to 2800° F., while the stellite has a melting point of approximately 2300° F. to 2400° F. Hence, it follows that the stellite will assume a molten condition at a temperature considerably below that at which the surface of the tapered portion 13 can be brought to a suitably softened condition (below its actual melting point) to enable a proper bond to be formed between the stellite and the valve head. Furthermore, in order to prevent the metal of the valve body from entering into the stellite in a sufficient quantity to be detrimental to the desired qualities of the latter, it is necessary to effect a union between the stellite and a very thin external, or skin, section of the surface of the seating portion 13.

The method which I preferably employ for accomplishing this object through an apparatus such as shown in the drawing is by first preheating the peripheral portion of the valve head by means of electrical current flowing through conductors 31 and 32 and through the conductor blocks 16 and 27, the rings 25, and the rings 26 and 29 between which the valve head is clamped under pressure sufficient to insure proper electrical contact between the ends of the rings 26 and 29 and the valve head; when the current thus supplied shall have placed the surface of the seating portion 13 in the aforesaid softened condition, suitable for enabling it to form a bond with molten stellite, the molten stellite, at a temperature below that required to place the surface of the seating portion 13 in said suitably softened condition, is then delivered into the mold 21 from an electric furnace, indicated schematically at F and provided with heating conductors G, G' and with a thermostat, indicated at H, which operates, in connection with one of the well-known types of current regulators, to control the temperature of the molten metal in the furnace. K denotes a pyrometer for indicating visually the temperature of the molten metal; it can be used also in connection with hand-operated means for controlling the current which heats the furnace and thereby the temperature of the molten metal. The details of the furnace and its controls forming no part of the invention claimed herein, description of the same will be unnecessary. The furnace is shown as having a spout S which may be provided with a suitable valve V through which the molten stellite is delivered into the mold 21. This valve may be a metering valve capable of delivering into the mold an amount of stellite capable of filling the latter. The stellite having been thus delivered to the mold, the current to the peripheral portion of the valve head will be cut off approximately as soon as the mold shall have been filled, or a very few seconds thereafter. Extending the mold above the surface of the seating portion allows for shrinkage of the stellite, due to cooling, and also provides for the accommodation of any impurities that may arise to the top of the molten stellite.

The apparatus described herein has been designed with special reference to its ability to secure the effective heating of the peripheral portion of the valve head in a short period of time. This period of time is capable of being rendered so short as to prevent any detrimental oxidation of the surface of the seating portion 13 from occurring, prior to the covering of such surface with the molten stellite, and which oxidation would interfere with the proper bonding of the two metals. However, the possibility of such oxidation occurring can be avoided by subjecting the surface of the seating portion 13 to the action of a suitable dry or fluid flux or deoxidizing agent. It will be evident that the amount of current which has to be delivered through this portion of the valve head will vary greatly with the diameter and other proportions of the head. Where a valve head of about 3" diameter is used and the head is of the hollow sodium-cooled type, an alternating current of approximately 80,000 amps. and 3.15 volts will be effective.

The apparatus shown in the drawing is designed with reference to handling such a high current and utilizing the same for rapidly and most effectively heating the surface of the seating portion of the valve head. The electrodes 26 and 28, being of a material of relatively high specific electrical resistivity and of correct dimensions, will be heated considerably by the passing of the high current through them, and their annular end portions which contact with the peripheral portion of the valve will offer a still greater resistance to the flow of current, due to the reduced areas of such contacting portions, and therefore will attain a still higher temperature, being brought to a bright white heat; and the surface of the seating portion of the valve head will be heated, not only by the current passing between the electrodes 26 and 29 and through the peripheral portion of the valve head, but also by heat radiated and conducted from the extremely hot end portions of the electrodes. The temperature of these annular electrode end portions will probably be higher than that which would be produced in the peripheral portion of the valve head by the mere passage of the current therethrough. The surface of the seating portion of the valve head will benefit to a greater degree from the heat thus applied externally thereto by radiation and conduction than will the interior of the metal of the valve head. The characteristic comparatively low heat conductivity of the graphite used for the electrodes will prevent the copper blocks 16 and 27 from conducting heat away from the hot end portions of the electrodes to any appreciable extent. In order to assist still further in the heating of the end portion of the lower electrode 26, the rings 25 which are interposed between the said electrode and the copper block 16 are of a carbon material having a still higher specific electrical resistivity than that of the graphite electrode material; they also increase the heat-insulation between the said electrode and the copper block 16. By varying the number and the thickness of the rings 25 as well as the contact resistance between one another and the electrode 26, their electrical and thermal effect on the said electrode may be varied.

From the foregoing description, it will be seen that the desired result of heating the skin surface of the seating portion 13 to the desired degree has been accomplished by concentrating the passage of current through the valve head to the peripheral portion of the same and by enhancing the heating effect of the current upon the surface of the seating portion 13 by means of externally applied heat due to radiation and conduction from the heated ends of the electrodes.

As a modification of the method described, but wherein the same apparatus may be employed, I contemplate preheating the surface of the seating portion 13 to a temperature approximating, but somewhat below, that at which a very thin outer skin will be softened sufficiently to permit its union with the stellite, and to raise this surface to such temperature by delivering, into the mold, stellite at a temperature such that the outer skin of the seating portion 13 will soften and bond with the stellite.

The foregoing operations can be automatically controlled by the employment of one or more of the following means:

After the time required for bringing the skin of the portion 13 to the desired temperature has been ascertained, clock mechanism can be connected up into the circuit which includes the electrode rings 26 and 29, whereby the current supplied through the said rings and the interposed peripheral portion of the valve body will be cut off at the end of this predetermined time. Because of variations which may occur in current supplied to the said electrodes, it is contemplated that an ammeter will also be included in the electrical circuit and the current adjusted in accordance with the reading of the ammeter. Furthermore, the same result may be obtained by the use of an ampere-hour, or watt-hour, meter including an adjustable stop which may be set to the ampere-hour or watt-hour point requisite for heating the surface 13 to the desired condition, with a friction-driven pointer which, when it engages the said contact, will operate, through a suitable auxiliary relay in a circuit including the electrode rings, to cut off the current supplied thereto and to the portion of the valve body interposed therebetween. After such engagement, the pointer can be reset to zero ready for the next heating operation. As the manner of connecting either of these time mechanisms with an auxiliary relay in the circuit including the electrode rings is well known to those skilled in the art, no detailed description or illustration of the same will be necessary.

As a modification of the automatic means for controlling the current by which the seating portions of the valve bodies shall be heated before introducing stellite into the mold, a thermo couple, indicated at 33, can be used, the couple being inserted, for instance, within a cavity provided therefor in the mold, as shown, and being connected, through means including an auxiliary relay, with a relay for controlling the supply of current to the said electrodes, the thermo couple being so constructed as to operate the current-controlling relay through said auxiliary relay, thereby to cut off the current when the temperature of the surface of the seating portion 13 shall have reached the necessary point to enable the bonding action to take place.

As a still further means for automatically controlling the time for heating the seating portion 13 of the valve body, a photo-electric cell 34 may be used, whereby, when the surface 13 shall have assumed a color, corresponding to the desired degree of softness requisite to enable it to unite with the molten stellite, the cell will operate, through suitable means including an auxiliary relay, to open the circuit.

The shortness of time required for bonding metals in accordance with my invention as heretofore described enables me to obtain a weld which is non-porous, and which is homogeneous throughout.

Having thus described my invention, what I claim is:

1. The process of providing the frusto conical peripheral portion of a metallic body with a surrounding ring of different metal, said process consisting in simultaneously passing a heating electrical current, throughout their entire respective extents, through narrow annular areas of the bases of said frusto conical peripheral portion, said areas being located in close proximity to the ends of said frusto conical peripheral portion, thereby to bring only the external surface of said frusto conical peripheral portion to a predetermined temperature; melting the other metal; casting the molten metal, at a predetermined temperature and in ring-like form, about the said frusto conical peripheral portion; and controlling the temperature of the said frusto conical peripheral portion and of said molten metal whereby the said molten metal will form a bond with the said frusto conical peripheral portion including only the thin outer skin of said portion.

2. The process of providing the frusto conical peripheral portion of a metallic body with a surrounding ring of metal having a different melting point than that of said body, said process consisting in clamping the said body between opposed electrodes, one of said electrodes forming an annular contact with said body in a narrow zone immediately adjacent to one of the bases of the frusto conical peripheral portion and the other of said electrodes forming an annular contact with said body in a narrow zone and immediately adjacent to the opposite base of said frusto conical peripheral portion; passing an electric current through said electrodes and the interposed frusto conical peripheral portion of said body until the frusto conical peripheral portion thereof has been brought to a predetermined temperature; melting the other metal; casting the molten metal, at a predetermined temperature and in ring-like form, about the frusto conical peripheral portion; and controlling the temperature of the said frusto conical peripheral portion and of the said molten metal whereby the said molten metal will form a bond with the said frusto conical peripheral portion including only the thin outer skin of said portion.

3. The process of providing the frusto conical peripheral portion of a metallic body with a surrounding ring of metal having a different melting point than that of said body, said process consisting in clamping the said body between opposed electrodes, one of said electrodes forming an annular contact with said body in a narrow zone immediately adjacent to one of the bases of the frusto conical peripheral portion and the other of said electrodes forming an annular contact with said body in a narrow zone and immediately adjacent to the opposite base of said frusto conical peripheral portion; passing an electric current through said electrodes and the interposed frusto conical peripheral portion of said body until the surface of the frusto conical peripheral portion has become softened; melting to a predetermined temperature the metal having a different melting point than said body; and casting the molten metal in ring-like form about the said frusto conical peripheral portion, while the surface thereof is in such softened condition.

4. The process of providing the frusto conical peripheral portion of a metallic body with a surrounding ring of metal having a different melting point than that of said body, said process consisting in clamping the said body between opposed electrodes, one of said electrodes forming an annular contact with said body in a narrow zone immediately adjacent to one of the bases of the frusto conical peripheral portion and the other of said electrodes forming an annular contact with said body in a narrow zone immediately adjacent to the opposite base of said frusto conical peripheral portion; passing an electric current through said electrodes and the interposed frusto conical peripheral portion of said body until the surface of the frusto conical peripheral portion has been rendered suitable for bonding with the other metal; melting to a predetermined temperature, the metal having a different melting point than said body; and casting the molten metal in ring-like form about the said frusto conical peripheral portion, while the surface thereof is in such suitable condition.

5. The process of providing the frusto conical peripheral portion of a metallic body with a surrounding ring of different metal, said process consisting in clamping the peripheral portions of said body located on opposite sides of said frusto conical peripheral surface and immediately adjacent to the bases of said frusto conical peripheral portion between narrow annular portions of electrodes having high heat resistivity and relatively high electrical resistivity, supplying electric current through said electrodes and the interposed portion of said body, thereby to soften the outer skin surface of said frusto conical peripheral portion by its resistance to the current and also by radiation and conduction from the said electrodes; melting the other metal; and casting the molten metal, at a predetermined temperature and in ring-like form, about the surface which has been thus softened.

6. In an apparatus for bonding a metallic ring to the peripheral surface of a metallic body, the combination of a mold of refractory material having a bore therethrough and a wall extending upwardly from the top of said bore and adapted to form an annular space with and surrounding the said surface, a lower electrode having an annular upper end portion adapted to engage the lower portion of the said body adjacent to the bottom of the said surface, a metallic block supporting the said electrode, an upper electrode having an annular lower end portion adapted to engage the said body adjacent to the upper end of the said surface, a metallic block in electrical contact with the latter electrode, and means for supplying an electric heating current through the said blocks, the electrodes connected thereto and through the peripheral portion of the first mentioned metallic body which includes the said surface.

7. In the apparatus recited in claim 4, the annular end portion of each electrode being narrow in width and the said electrodes each possessing high heat resistivity and relatively high electrical resistivity.

8. In an apparatus for bonding a metallic ring to the peripheral surface of a metallic body, the combination of a mold of refractory material having a bore therethrough and a wall extending upwardly from the top of said bore and adapted to form an annular space with and surrounding the said surface, an upper and a lower block of high electrical conductivity, an upper electrode of high heat resistivity and relatively high electrical resistivity in electrical contact with the upper block and having a narrow annular lower end portion adapted to engage the said body adjacent to the upper end of said surface, a lower electrode of high heat resistivity and relatively high electrical resistivity in electrical contact with the lower block and having a narrow annular upper end portion adapted to engage the said body adjacent the lower end of said surface, the electrical contact between one of said electrodes and its cooperating block including a bore in said block and one or more rings of material having high electrical resistivity in said bore and each contacting the wall of said bore and electrically interposed between the last mentioned electrode and its cooperating block, and means for supplying an electric current through the said block, the said ring or rings and electrodes and the peripheral portion of the metallic body which includes the said surface.

9. In an apparatus for bonding a metallic ring to the peripheral surface of a metallic body, the combination of a mold of refractory material having a bore therethrough and a wall extending upwardly from the top of said bore and adapted to form an annular space with and surrounding the said surface, a lower electrode ring of high heat resistivity and relatively high electrical resistivity and having a narrow annular upper end portion adapted to engage the lower portion of the said body adjacent to the bottom of the said surface, a metallic block of high electrical conductivity having a central bore adapted to register with the bore of said mold, one or more rings of material having high electrical resistivity and supported within the second bore with their external surfaces in contact with the wall thereof and on the upper surface of the uppermost of which latter rings the lower electrode ring is supported, an upper electrode of material having high heat resistivity and relatively high electrical resistivity and provided with a narrow annular lower end portion adapted to engage the said body adjacent to the upper end of the said surface, a metallic block of high electrical conductivity in electrical contact with the latter electrode, and means for supplying an electric heating current through the said blocks, the said ring or rings and electrodes and the peripheral portion of the metallic body which includes the said surface.

10. In an apparatus for bonding a metallic ring to the tapered or frusto conical seating surface of a valve suitable for an internal combustion engine, the combination of a mold having a bore therethrough of substantially the diameter of the lower end of the said surface and having an upwardly extending wall forming an annular space with and surrounding the said surface, a metal block of high electrical conductivity having a bore registering with and constituting an extension of the bottom of the bore of said mold, one or more rings of material having high electrical resistivity and relatively low heat conductivity mounted within the bore of said block with their outer surfaces in contact with the wall thereof, an electrode ring of high heat resistivity and relatively high electrical resistivity mounted on top of the uppermost of said rings and having an annular upper surface adapted to engage the lower peripheral portion of the valve head adjacent to the lower end of the said tapered or frusto conical surface, an upper metal block of high electrical conductivity, an upper electrode of high heat resistivity and relatively high electrical resistivity electrically connected to the said upper block and provided at its lower end with an annular surface adapted to engage the upper peripheral portion of said body above the upper end of said tapered or frusto conical surface, and means for supplying an electric current through the said blocks and the said ring or rings and electrodes and through the tapered or frusto conical seating surface of the valve interposed between the said electrodes.

11. In an apparatus for bonding a metallic ring to the tapered or frusto conical seating surface of a valve head suitable for an internal combustion engine, the combination of a mold having a bore of substantially the diameter of the lower end of the said surface and having an upwardly and outwardly extending wall forming an annular space with and surrounding the said surface, a metal block of high electrical conductivity having a bore, the bottom of the bore of said block having an annular shoulder, rings of material having high electrical resistivity and relatively low heat conductivity mounted on said shoulder with their outer surfaces in contact with the wall of the bore of said block, an electrode ring of high heat resistivity and relatively high electrical resistivity mounted on top of the uppermost of said rings and having a narrow annular upper surface adapted to engage the lower peripheral portion of the valve head adjacent to the lower end of the said tapered or frusto conical surface, an upper block of metal having high electrical conductivity, an upper electrode of high heat resistivity and relatively high electrical resistivity carried by the said upper block and provided at its lower end with a narrow annular surface adapted to engage the upper peripheral portion of said body above the upper end of said tapered or frusto conical surface, and means for supplying electric current through the said blocks and the said rings and electrodes and thereby through the tapered or frusto conical seating surface of the valve interposed between the said electrodes.

ANTONIO LONGORIA.